United States Patent [19]

Kitzinger et al.

[11] Patent Number: 4,708,495
[45] Date of Patent: Nov. 24, 1987

[54] METAL SURFACE TEMPERATURE MONITOR

[75] Inventors: Frank Kitzinger, Montreal; Vladimir M. Labuc, Hudson, both of Canada

[73] Assignee: Noranda Inc., Toronto, Canada

[21] Appl. No.: 820,953

[22] Filed: Jan. 21, 1986

[30] Foreign Application Priority Data

Apr. 23, 1985 [CA] Canada .................................. 479758

[51] Int. Cl.$^4$ ...................... G01K 13/04; G01K 7/08
[52] U.S. Cl. .................................. 374/154; 374/180; 374/208
[58] Field of Search ............. 374/153, 154, 179, 180, 374/182, 139, 208, 210, 181; 136/229, 230, 221

[56] References Cited

U.S. PATENT DOCUMENTS

| | | | |
|---|---|---|---|
| 2,007,118 | 7/1935 | Bosomworth | 136/221 |
| 2,694,313 | 11/1954 | Nieman | 374/154 |
| 3,713,124 | 1/1973 | Durland et al. | 374/153 |
| 3,792,342 | 2/1974 | Ogawa et al. | 374/153 |
| 3,824,857 | 7/1974 | Smith | 374/179 |
| 3,878,721 | 4/1975 | Nath | 374/154 |
| 4,046,009 | 9/1977 | Sauer | 374/153 |
| 4,114,444 | 9/1978 | Schwenninger | 374/153 |
| 4,150,358 | 4/1979 | Aviander | 374/153 |
| 4,403,218 | 9/1983 | Beal et al. | 374/154 |

FOREIGN PATENT DOCUMENTS

| | | | |
|---|---|---|---|
| 1941816 | 4/1971 | Fed. Rep. of Germany | 374/179 |
| 812674 | 4/1959 | United Kingdom | 374/181 |
| 0754230 | 8/1980 | U.S.S.R. | 374/154 |
| 0773458 | 10/1980 | U.S.S.R. | 374/154 |
| 0821956 | 4/1981 | U.S.S.R. | 374/154 |

Primary Examiner—Charles Frankfort
Assistant Examiner—Thomas B. Will
Attorney, Agent, or Firm—Fleit, Jacobson, Cohn & Price

[57] ABSTRACT

A metal surface temperature monitor is disclosed. The monitor comprises a rotating sensor head including two wheels fabricated from thermocouple materials and adapted to ride on the surface of the metal to measure the temperature thereof, a converter for converting the thermal EMF generated by the thermocouple to a low frequency coded signal, a transformer having a stationary primary winding and a secondary winding which is free to rotate with the sensor head, a modulating circuit associated with the primary and secondary windings of the transformer for transferring the frequency coded signal from the secondary to the primary winding of the transformer, and means connected to the primary winding of the transformer for demodulating the frequency coded signal to provide an indication of the temperature of the moving metal surface.

7 Claims, 4 Drawing Figures

METAL SURFACE TEMPERATURE MONITOR

This invention relates to a metal surface temperature monitor, and more particularly to a device for continuous measurement of the surface temperature of moving solid metals such as in continuous bar or strip casting and annealing operations.

The methods currently available for the measurement of metal surface temperatures can be classified as follows:

(a) Manual measurements using contact probes based on thermovoltaic (thermocouple) or thermoresistive (thermistors, platinum resistance devices) principles. These manual methods are time consuming, subject to operation error, and unsuitable for direct process control.

(b) Optical pyrometry techniques. Continuous measurement of moving metal surfaces is normally accomplished using optical pyrometers. At high temperatures, metals radiate enough energy to enable reliable readings to be taken. However, at lower temperatures and low emissivity the radiated energy may become too low for the pyrometer sensor to detect. Furthermore, calibration of the pyrometer system is normally performed via an emissivity control which, in most cases, is a simple gain control of typically 10-1 ratio. Setting of this control must be performed in accordance with known emissivity charts and preferably with an auxiliary temperature calibration instrument which indicates the true reading. Once calibrated, any changes in surface emissivity will directly affect the measured reading. However, unacceptable variations of emissivity often results from the presence of surface coatings such as oxides, sulphides or organic lubricants.

It is therefore the object of the present invention to provide a metal surface temperature monitor for replacing optical pyrometers in low temperature applications where low or widely varying emissivity causes significant inaccuracies.

The metal surface temperature monitor, in accordance with the present invention, comprises a rotating sensor head including two wheels fabricated from thermocouple materials riding on the surface of the moving metal to measure the temperature thereof, a converter for converting the thermal EMF generated by the sensor head to a low frequency coded signal, a transformer having a stationary primary winding and a secondary winding which is free to rotate with the sensor head, a modulating circuit associated with the primary and secondary windings of the transformer for transferring the frequency coded signal across the gap of the transformer, and means connected across the primary of the transformer for demodulating the frequency coded signal to provide an indication of the temperature of the moving metal surface.

The above mentioned modulating circuit preferably comprises a high frequency power oscillator, a first capacitor interconnecting the high frequency power oscillator to the primary winding of the transformer to cause a state of resonance at the oscillator frequency, and a second capacitor connected in series with an electronic switch across the secondary winding of the transformer. The electronic switch is connected to the output of the converter and is responsive to the frequency coded signal to switch the second capacitor in and out whereby the capacitance of the second capacitor is reflected back into the primary winding of the transformer causing a small change in the resonance frequency of the system and a periodic amplitude change in the primary winding excitation voltage corresponding to the frequency coded signal.

The means for demodulating the frequency coded signal preferably comprises a low pass filter for separating the low freqency coded signal from the high frequency signal of the power oscillator and a pulse shaper for reconstructing the low frequency coded signal. Means may be provided for converting the low frequency coded signal into an analog signal which may be fed to a panel meter to display the temperature of the moving metal surface.

The invention will now be disclosed, by way of example, with reference to a preferred embodiment illustrated in the accompanying drawings in which.

Figures 1, 2:
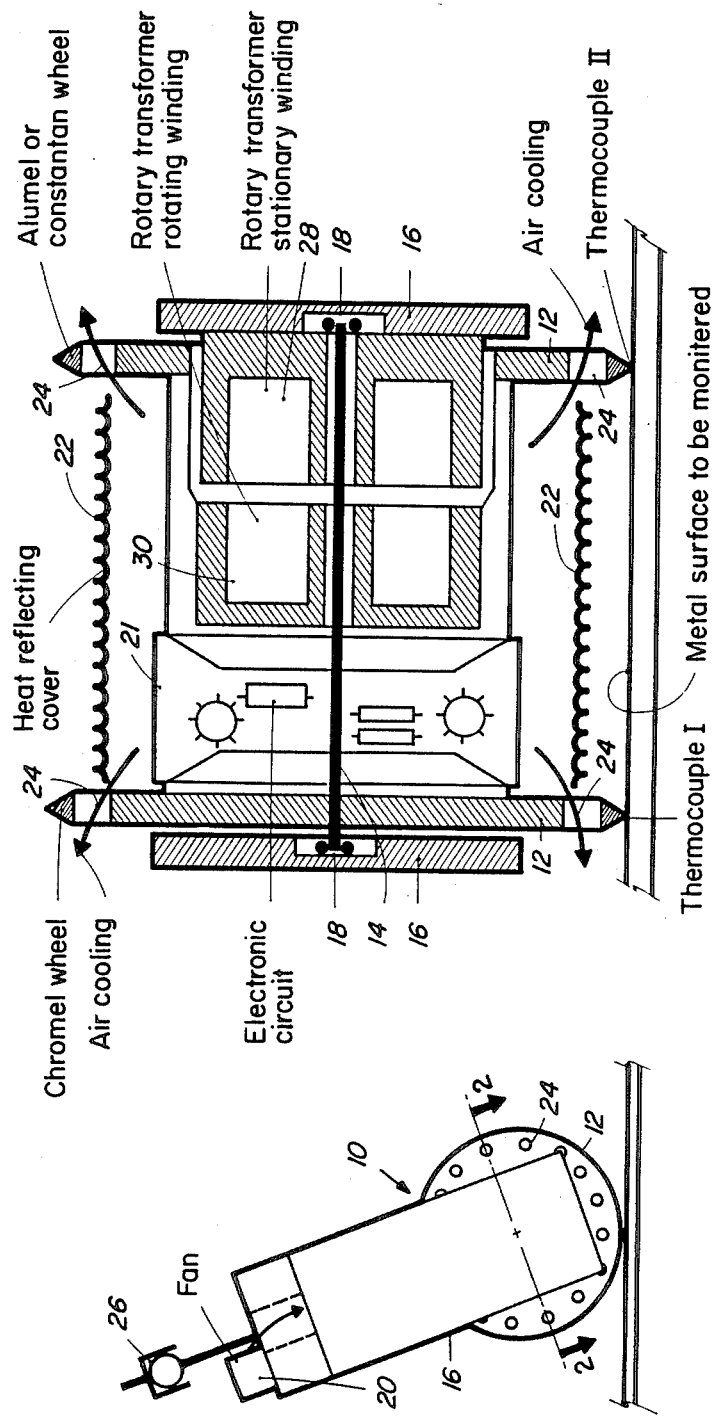
FIG. 1 illustrates a schematic side view of the monitor in accordance with the invention.
FIG. 2 is an enlarged cross sectional view taken along line 2—2 of FIG. 1.

Referring to FIGS. 1 and 2, there is shown the mechanical arrangement of the temperature monitor which consists of a sensor head 10 including two wheels 12 of thermocouple materials (Chromel-Alumel, Chromel-Constantan or others) riding on the surface of the metal being measured. The wheels are mounted on a shaft 14 which is itself mounted for rotation in a support channel having a pair of support arms 16 provided with ball-bearings 18. The support arms 16 are at an angle with the moving metal surface. Forced air from a fan 20 located on the top of the support channel is carried through a hole (not shown) in the top of the support channel as shown by an arrow in FIG. 1 and is blown into the sensor head where a flow is maintained around the electronic circuitry which is mounted on a circuit board 21 also located on the shaft 14. A heat reflecting cover 22 is mounted around the electronic circuitry together with shields (not shown) on the bottom section of the sensor head to reflect much of the incident radiated surface heat. The flow of air from the fan 20 exits through holes 24 drilled around the circumference of the thermocouple wheels. Heat transfer from the metal surface to the electronic circuitry is thus minimized.

The sensor head support channel is attached to a universal joint 26 which allows freedom of movement in two axes to ensure surface contact if irregulaties in the metal are present. Up and down movement of ±10° with respect to the longitudinal axis of the surface is possible with a simultaneous ±10° freedom of rotation about the horizontal plane normal to the direction of metal strip or sheet travel.

The sensor head further comprises a pot-core transformer having a stationary winding 28 secured to one of the support arms 16 and a rotary secondary winding 30 secured to the wheels 12.

It is to be understood that the above disclosed sensor head is not restricted to the described design and may be modified to suit individual measurement conditions. For example, narrow bars may be measured by reducing the width of the sensor head and bringing the thermocouple wheels closer together. Since in some case excessive surface oxides can cause contact problems at the thermocouple sensing points, a rotating wire brush can be installed ahead of the sensor to clean the surface prior to measurement. Conversely, the rotating head itself can be motor driven with brush-wheels made of thermocouple wires. In this fashion, oxide layer penetration and measurement contact can be made with one compact unit.

Figure 3:
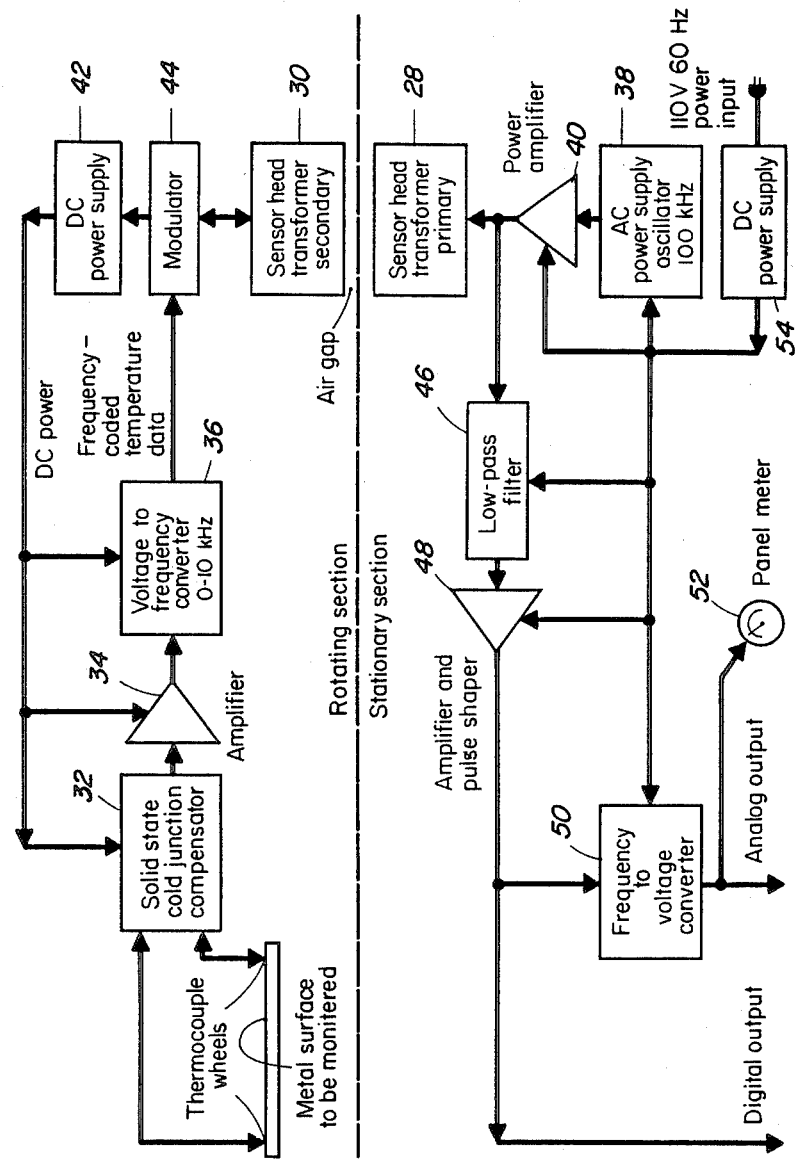
FIG. 3 is a block diagram of the electronic circuit of the monitor.
Figure 4:
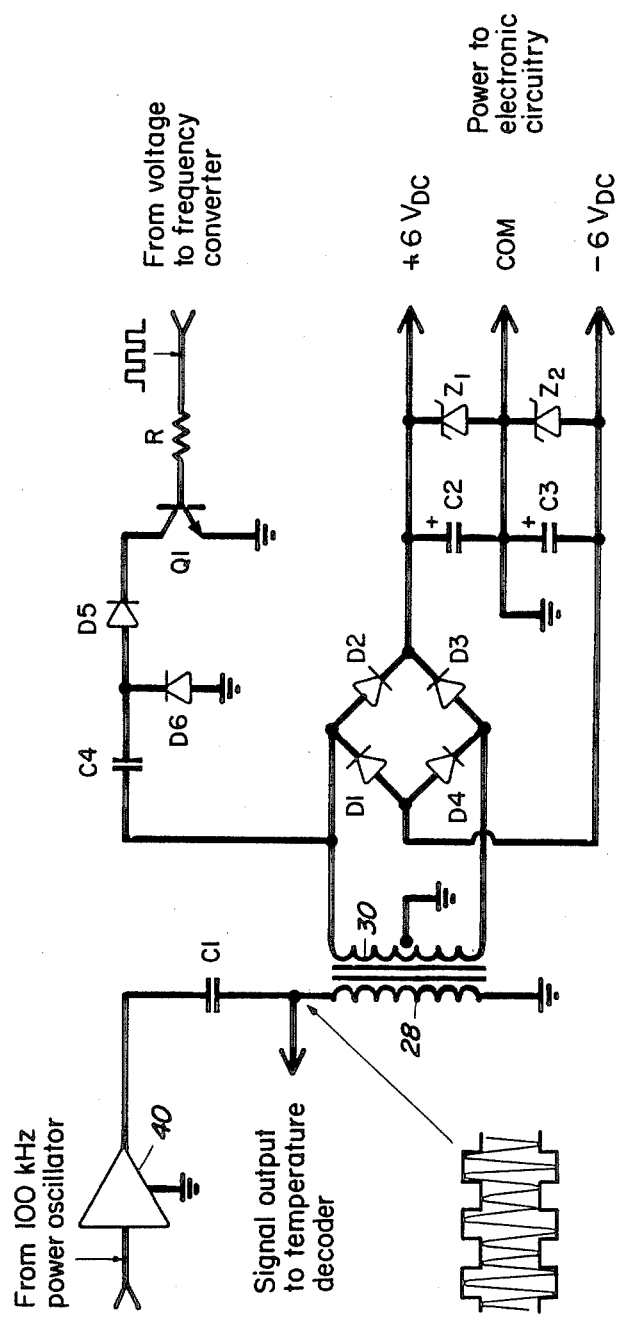
FIG. 4 is a detail circuit diagram of a part of the electronic circuit of FIG. 3.

Referring now to FIGS. 3 and 4, a thermal EMF is generated at the junction of each thermocouple wheel and the metal surface. Since the metal surface being monitored is common to both junctions, its thermovoltaic effect is cancelled out. The equivalent circuit of this arrangement is that of a single junction comprised of two thermocouple wheel materials operating at the temperature of the metal surface at the point of measurement. Thermocouple measurements are essentially differential in principle and a reference junction at some known temperature, e.g. 0° C., is commonly provided to ensure calibrated readings. In the present metal surface temperature monitor, maintaining the internal reference junction at a constant temperature is impractical. Instead, a conventional solid state linear temperature sensor 32, such as the one sold by Analog Devices Inc. (AD 590 KF) may be used to provide an output current proportional to the temperature of the reference junction and to automatically compensate the output of the measuring junction for changes in internal temperature. In effect, an electronic equivalent of the standard cold-junction is produced.

The compensated thermocouple output is amplified by a conventional amplifier 34 and fed to a voltage to frequency converter 36 which provides a calibrated square wave frequency coded output signal varying from 0–10 kHz in proportion to measured full scale temperatures. The prototype of the present monitor was designed to indicate 0°–500° C. but higher or lower temperature ranges, or expanded scales (e.g. 100°–300° C.) are also envisaged.

The frequency coded temperature data appearing at the output of converter 36 is applied to a novel modulating system which is shown in block form in FIG. 3 and in detail in FIG. 4 of the drawings. Referring first to FIG. 3, a high frequency (100 kHz) oscillator 38 in the stationary electronics section of the monitor drives a power amplifier 40. As shown in block diagram form in FIG. 3 and in detail circuitry in FIG. 4, the output of amplifier 40 is fed to the sensor head transformer primary winding 28. A capacitor C1 of suitable value is placed in series with the primary winding 28 to cause a state of resonance at the oscillator frequency. In this condition, the nominal 15 V peak to peak output of the amplifier 40 is boosted to approximately 100 V peak to peak at the primary winding 28. This signal is transferred across the air gap of the transformer into the rotating secondary winding 30 and is rectified, filtered and regulated down to 12 VDC power supply level by conventional circuitry including diodes D1–D4, capacitors C2 and C3 and Zener diodes Z1 and Z2, respectively. The 12 VDC power supply is identified by reference numeral 42 in FIG. 3 of the drawings and provides power to solid state cold junction compensator 32, amplifier 34 and voltage to frequency converter 36 of the monitor. The frequency coded signal from the voltage to frequency converter 36 is applied to a modulator 44 which is shown in block form in FIG. 3 and in detail in FIG. 4 of the drawings. The modulator includes a capacitor C4 which is connected in series with the collector-emiter electrodes of a switching transistor Q1 through current rectifying diodes D5 and D6. The frequency coded signal is applied to the base of the transistor Q1 through a resistor R and is used to switch capacitor C4 in and out across the secondary winding 30 of the transformer. When the capacitor is switched in, the increased capacitance is reflected back into the stationary primary winding 28 of the transformer and causes a small change in the resonant frequency of the circuit. This change is seen as a periodic amplitude change in primary excitation voltage and can be sensed across the stationary primary winding 28 of the transformer. This way, the frequency coded temperature data appears as amplitude modulation over the 100 kHz power output supply.

Traditional methods of transferring similar bi-directional data require the use of two separate power drivers for supply and return signals, and dual filtering at both ends to eliminate interaction between the two circuits. In the present metal surface temperature monitor, data signals are transmitted with essentially no extra power requirements. As shown in FIG. 3 of the drawings, the signal appearing at the output of the primary winding is fed to a low-pass filter 46 which separates the 0–10 kHz coded temperature signal from the higher frequency power drive from oscillator 40 and feeds it to an amplifier and pulse shaper 48 for providing a digital output representing the temperature of the metal surface. The reconstructed square wave frequency coded signal is also fed to a frequency to voltage converter 50 which provides an analog output for a panel meter 52 and an external output for remote indication or closed loop process control.

Referring to FIG. 3, a conventional DC power supply 54 is provided to supply operating potential to the oscillator 38, the power amplifier 40, the low pass filter 46, the amplifier and pulse shaper 48 and the frequency to voltage converter 50 of the stationary section of the monitor.

The advantages of the above disclosed temperature monitor are as follows:

1. Continuous monitoring of low temperature (0°–600° C.) moving metal surfaces using a non-optical method.

2. Elimination of direct electrical contact in transferring temperature data from the rotating measurement section to the stationary display electronics. Electrical contact noise and wear are non existent.

3. Ability to measure different types of moving conducting surfaces without recalibration.

4. Temperature data is transferred in the form of a frequency coded signal and is much less susceptible to electromagnetic interference compared to standard analog systems.

5. Two wire operation. Both power and temperature data are carried along a single two conductor cable remotely located from the sensor head.

6. A novel data transformer is disclosed wherein the power supply signals transferred across the rotating transformer air gap perform the dual role of energizing the sensor head circuitry and also of carrying the coded temperature data back to the stationary processing section. This considerably lowers the number of necessary components resulting in a smaller unit size, increased long term reliability, and low power consumption resulting in negligible internal heat dissipation.

We claim:
1. A metal surface temperature monitor comprising:
  (a) a sensor head having a stationary section and a rotating section, said rotating section including two wheels fabricated from thermocouple materials and adapted to ride on the surface of the metal and generate an EMF which relates to the temperature of the metal surface;

(b) a converter associated with the rotating section of the sensor head and responsive to the EMF generated by the wheels of thermocouple materials for converting said EMF to a low frequency coded signal;

(c) a transformer having a primary winding associated with the stationary section of the sensor head and a secondary winding associated with the rotating section of the sensor head;

(d) a modulating circuit including a high frequency power oscillator connected to the primary winding of the transformer for generating a high frequency signal in said primary winding and means connected to the secondary winding of the transformer and responsive to said converter for modulating said high frequency signal by said low frequency coded signal for transferring the low frequency coded signal from the secondary to the primary winding of the transformer; and (e) means connected to the primary winding of the transformer for demodulating the low frequency coded signal to provide an indication of the temperature of the metal surface.

2. A monitor as defined in claim 1, wherein said modulating circuit further comprises a first capacitor interconnecting said high frequency power oscillator to the primary winding of the transformer to form a resonant circuit at the frequency of the oscillator, and wherein said means for modulating said high frequency signal comprises a second capacitor connected in series with an electronic switch across the secondary of the transformer, said electronic switch being connected to the output of the converter and responsive to the frequency coded signal to switch the second capacitor in and out whereby the capacitance of the second capacitor is reflected back into the primary winding of the transformer causing a small change in the resonance frequency of the resonant circuit and a periodic amplitude change in the output voltage of the primary winding corresponding to the frequency coded signal.

3. A monitor as defined in claim 2, wherein said means for demodulating the frequency coded signal is a low pass filter for separating the low frequency coded signal from the high frequency signal of the power oscillator, and a pulse shaper for reconstructing the low-frequency coded signal.

4. A monitor as defined in claim 3, further comprising means for converting said low frequency coded signal into an analog signal for feeding to a panel meter to display the temperature of the metal surface.

5. A monitor as defined in claim 1, wherein a cooling fan is mounted on the sensor head for minimizing heat transfer from the metal surface.

6. A monitor as defined in claim 1, further comprising a solid state cold junction compensator connected to the wheels of thermocouple materials to provide a reference junction at a known temperature for the wheels of thermocouple materials.

7. A monitor as defined in claim 1, wherein the sensor head is mounted on a universal joint which allows freedom of movement in two axes to insure surface contact if irregularities in the metal surface are present.

* * * * *